United States Patent
Cohen et al.

(10) Patent No.: US 8,731,494 B2
(45) Date of Patent: May 20, 2014

(54) DEVICE, SYSTEM AND METHOD OF DETECTING TRANSMITTER POWER

(75) Inventors: Emanuel Cohen, Haifa (IL); Amichay Israel, Haifa (IL); Ofir Degani, Haifa (IL); Nir Tsur, Motskin (IL)

(73) Assignee: Intel Corporation, Santa Clara, CA (US)

( * ) Notice: Subject to any disclaimer, the term of this patent is extended or adjusted under 35 U.S.C. 154(b) by 48 days.

(21) Appl. No.: 13/535,430

(22) Filed: Jun. 28, 2012

(65) Prior Publication Data

US 2014/0004810 A1     Jan. 2, 2014

(51) Int. Cl.
*H03C 1/62* (2006.01)
*H04B 17/00* (2006.01)

(52) U.S. Cl.
USPC ............... 455/115.3; 455/126; 455/127.1

(58) Field of Classification Search
USPC ............... 455/115.1–115.3, 126, 127.1, 129
See application file for complete search history.

(56) References Cited

U.S. PATENT DOCUMENTS

| 6,642,784 B2 * | 11/2003 | McMorrow | 330/129 |
| 2013/0027110 A1 * | 1/2013 | Beale et al. | 327/356 |

OTHER PUBLICATIONS

Wireless-Gigabit-Alliance (WGA) specifications (Wireless Gigabit Alliance, Inc WiGig MAC and PHY Specification Version 1.0, Final specification), Apr. 2010.
IEEE 802.Nov. 2007, IEEE Standard for Information Technology—Telecommunications and information exchange between systems—Local and metropolitan area networks—Specific requirements, Part 11: Wireless LAN Medium Access Control (MAC) and Physical Layer (PHY) Specifications; Jun. 12, 2007.
Ofir Degani et al., "A 90nm CMOS PA Module for 4G applications with embedded PVT gain compensation circuit." Power Amplifiers for Wireless and Radio Applications (PAWR), 2012 IEEE Topical Conference. Issue date Jan. 15-18, 2012, pp. 25-28.

* cited by examiner

*Primary Examiner* — Nhan Le
(74) *Attorney, Agent, or Firm* — Shichrur & Co.

(57) ABSTRACT

Some demonstrative embodiments include devices, systems and/or methods of detecting transmitter power. For example, a device may include a power detection circuit, coupled by a first coupler to a transmit chain, to provide a first output representing a measured non-calibrated transmission power over the transmit chain; a reference circuit, coupled to a reference voltage by a second coupler, to provide a second output representing a measured reference coupling factor; and a calibrator to determine a calibrated transmission power over the transmit chain based on the first and second outputs.

29 Claims, 6 Drawing Sheets

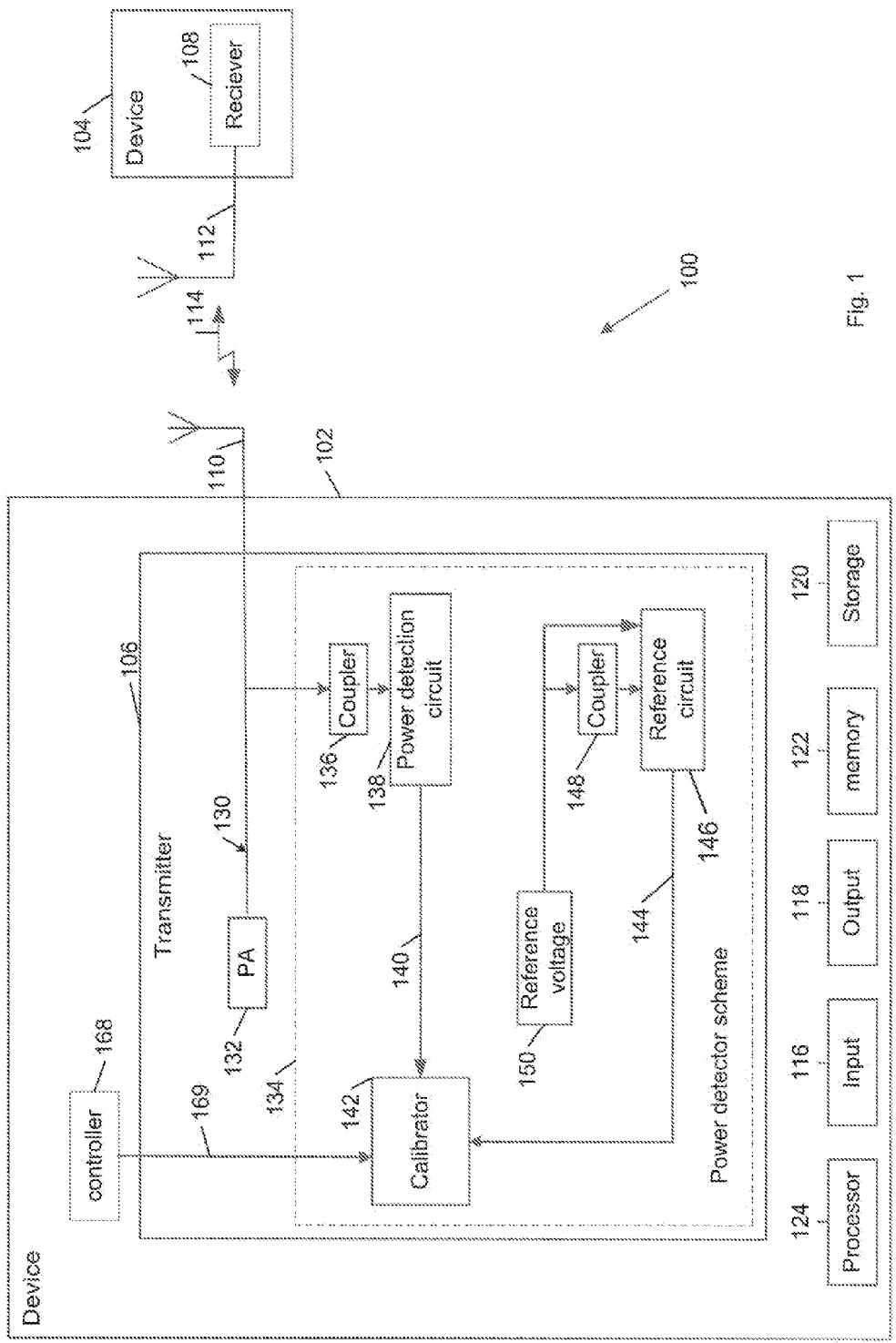

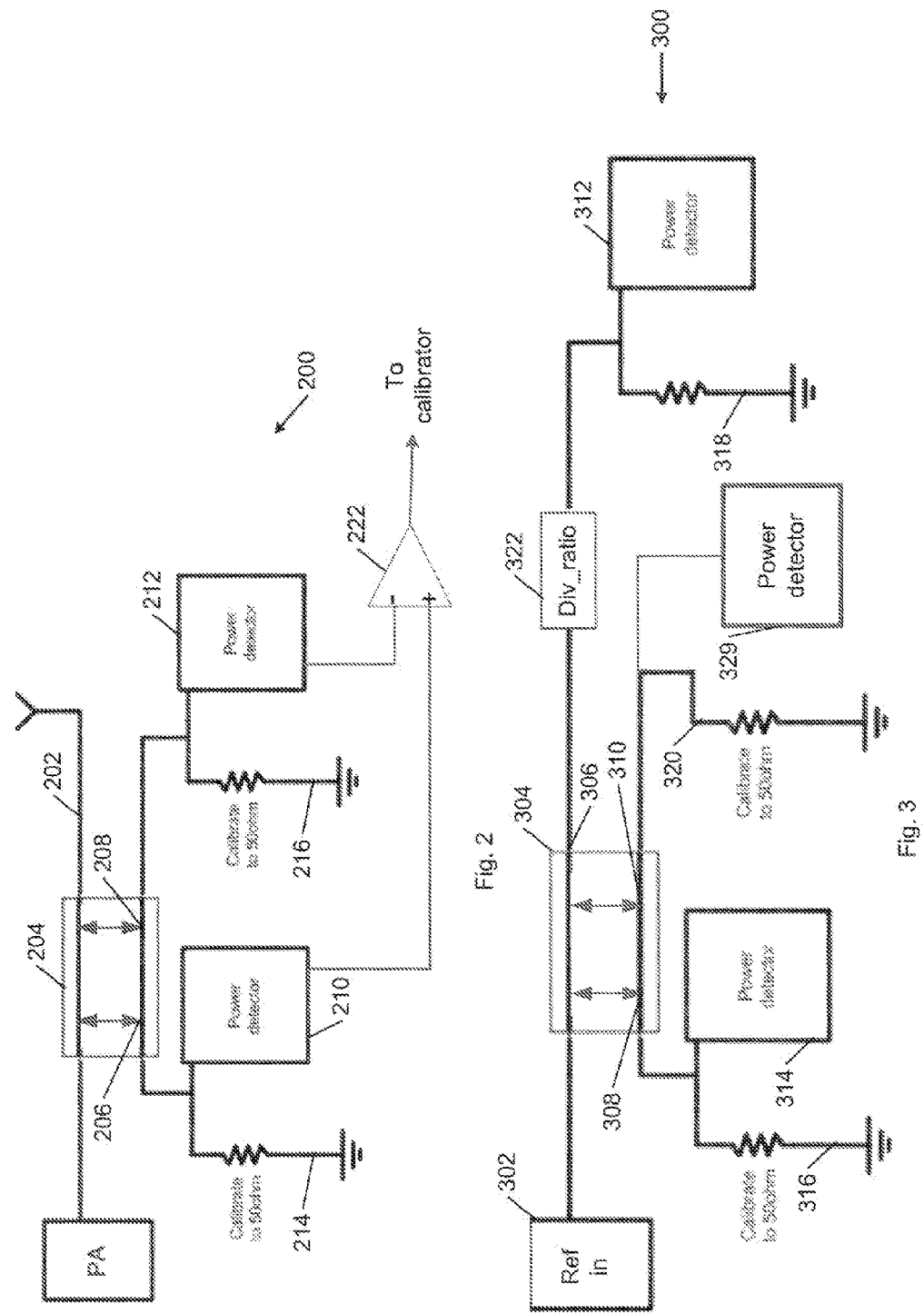

US 8,731,494 B2

DEVICE, SYSTEM AND METHOD OF DETECTING TRANSMITTER POWER

BACKGROUND

The output power of a wireless transmitter may vary, for example, in response to variations in manufacturing process, supply voltage, temperature (collectively referred to as "Process-Voltage-Temperature (PVT)"), and the like. For example, the output power may vary by about ±2 decibel (dB).

Elaborate and/or expensive production-line calibrations may be required in order to accurately estimate the output power of the transmitter.

The output power of the transmitter is typically calibrated during production. The calibration may be sensitive a Voltage-Standing-Wave-Ratio (VSWR). For example, the VSWR may result in an error in the output power of, for example, at least ±2 dB.

In addition, the calibration process may consume precious production time, which may affect production cost and/or complexity. For example, maintaining an accurate connection from a radio frequency integrated chip (RFIC) to external calibration equipment may become almost impossible as transmit frequency increases.

Relatively large design and/or safety margins may be taken into account, for example, in order to ensure compliance with error-vector-magnitude (EVM) requirements, spectral mask requirements, and/or any other suitable requirements, e.g., of a standard, specification and/or protocol.

Such margins may result in increased power consumption of the transmitter, e.g., by as much as one hundred percent, compared to a transmitter not implementing the design margins.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 1 is a schematic block diagram illustration of a system, in accordance with some demonstrative embodiments.

FIG. 2 is a schematic illustration of a power detection circuit, in accordance with some demonstrative embodiments.

FIG. 3 is a schematic illustration of a reference circuit, in accordance with some demonstrative embodiments.

DETAILED DESCRIPTION

Figure 4:
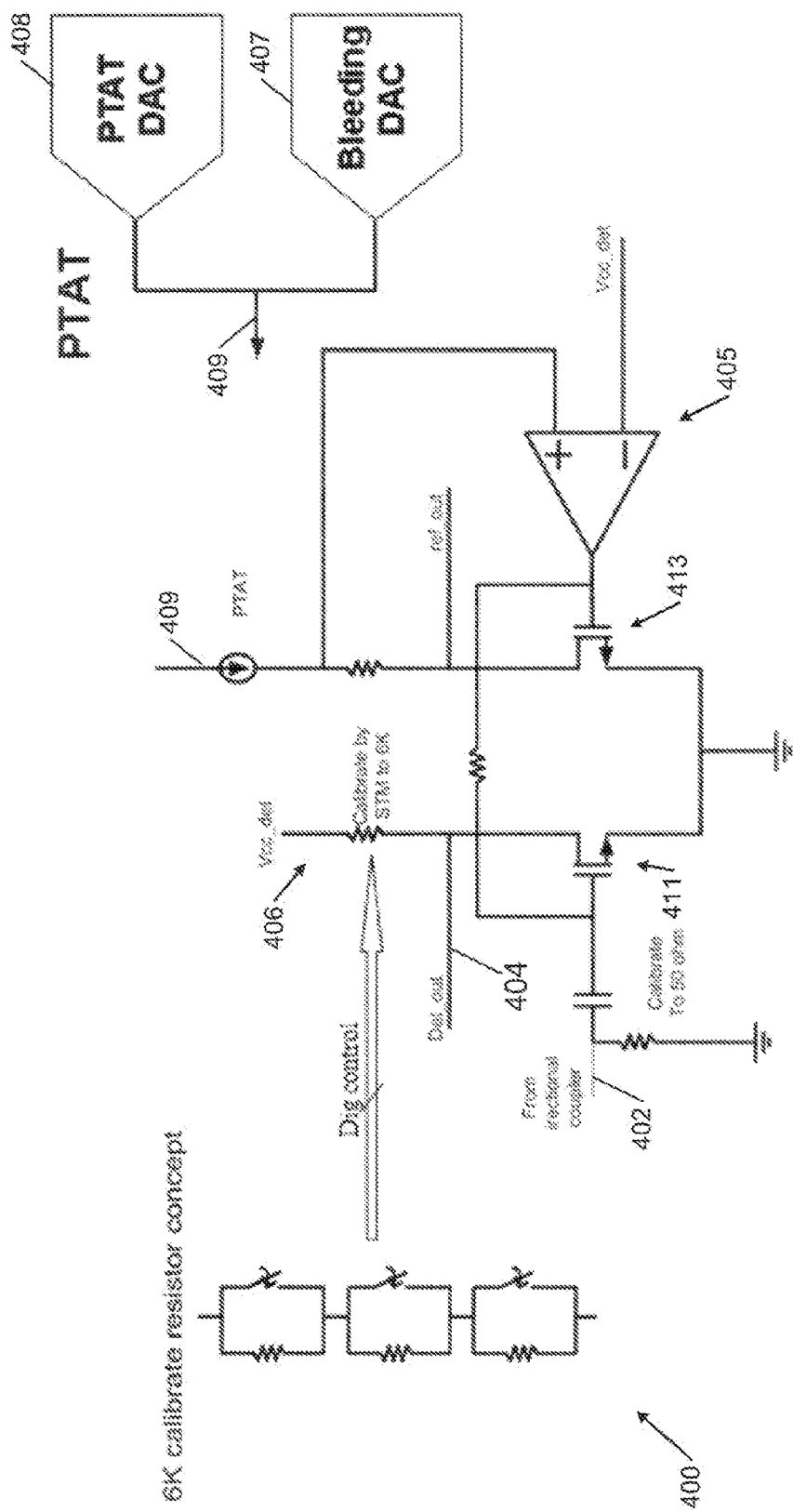
FIG. 4 is a schematic illustration of a power detector, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wire-*

*less Gigabit Alliance, Inc WiGig MAC and PHY Specification Version 1.0, April 2010, Final specification*) and/or future versions and/or derivatives thereof, devices and/or networks operating in accordance with existing IEEE 802.11 standards (*IEEE 802.11-2007, IEEE Standard for Information Technology—Telecommunications and information exchange between systems—Local and metropolitan area networks—Specific requirements, Part 11: Wireless LAN Medium Access Control (MAC) and Physical Layer (PHY) Specifications; IEEE 802.11n-2009, IEEE Standard for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Higher Throughput*; IEEE802.11 task group ac (TGac) ("*IEEE802.11-09/0308r12—TGac Channel Model Addendum Document*"); *IEEE 802.11 task group ad (TGad)* (*IEEE P802.11ad/D1.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60 GHz Band*), and/or future versions and/or derivatives thereof, devices and/or networks operating in accordance with existing IEEE 802.16 standards (*IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m*) and/or future versions and/or derivatives thereof, devices and/or networks operating in accordance with existing Wireless-WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. For example, the antenna may include at least one of a phased array antenna, a single element antenna, a set of switched beam antennas, and the like.

The phrases "directional multi-gigabit (DMG)" and "directional band (DBand)", as used herein, may relate to a frequency band wherein the Channel starting frequency is above 56 GHz.

The phrases "DMG STA" and "mmWave STA (mSTA)" may relate to a STA having a radio transmitter, which is operating on a channel that is within the DMG band.

Reference is now made to FIG. 1, which schematically illustrates a block diagram of a system 100, in accordance with some demonstrative embodiments.

In some demonstrative embodiments, system 100 may include one or more wireless communication devices, e.g., wireless communication devices 102 and/or 104, capable of communicating content, data, information and/or signals over at least one suitable wireless communication channel 114, for example, a radio channel, an IR channel, a RF channel, a Wireless Fidelity (WiFi) channel, and the like. In one example, channel 114 may include a DMG channel. One or more elements of system 100 may optionally be capable of communicating over any suitable wired communication links.

In some demonstrative embodiments, wireless communication devices 102 and/or 104 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a handset, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, a gaming device, an audio amplifier, a data source, a data sink, a Digital Still camera (DSC), a media player, a Smartphone, a television, a music player, an AP, a base station, or the like.

In some demonstrative embodiments, device 102 may include a transmitter 106 to transmit a wireless transmission to device 104 via at least one antenna 110. Device 104 may include a receiver 108 to receive the wireless transmission from device 102, e.g., via at least one antenna 112. Types of antennas that may be used for antennas 110 and/or 112 may include but are not limited to internal antenna, a phased-array antenna, a dipole antenna, an omni-directional antenna, a monopole antenna, an end fed antenna, a circularly polarized antenna, a micro-strip antenna, a diversity antenna and the like.

In some demonstrative embodiments, wireless communication devices 102 and/or 104 may also include, for example, one or more of a processor 124, an input unit 116, an output unit 118, a memory unit 122, and a storage unit 120. Wireless communication devices 102 and/or 104 may optionally include other suitable hardware components and/or software components. In some demonstrative embodiments, some or all of the components of each of wireless communication devices 102 and/or 104 may be enclosed in a common housing or packaging, and may be interconnected or operably associated using one or more wired or wireless links. In other embodiments, components of each of wireless communication devices 102 and/or 104 may be distributed among multiple or separate devices.

Processor 124 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 124 executes instructions, for example, of an Operating System (OS) of wireless communication devices 102 and/or 104 and/or of one or more suitable applications.

Input unit 116 includes, for example, a keyboard, a keypad, a mouse, a touch-pad, a track-ball, a stylus, a microphone, a touch-screen or other suitable pointing device or input device. Output unit 118 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 122 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 120 includes, for example, a hard disk drive, a floppy disk drive, a Compact Disk (CD) drive, a CD-ROM drive, a DVD drive, or other suitable removable or non-removable storage units. Memory unit 122 and/or storage unit 120, for example, may store data processed by wireless communication device 102 and/or 104.

In some demonstrative embodiments, wireless communication devices 102 and/or 104 may perform the functionality of DMG stations. For example, wireless communication devices 102 and/or 104 may be configured to communicate over the DMG band.

In some demonstrative embodiments, transmitter 106 may include at least one transmit (Tx) chain 130 connected to at least one antenna 110. For example, Tx chain 130 may include a power amplifier (PA) 132 to generate a RF signal to be transmitted via antenna 110, for example, by amplifying a power of at least one analog signal generated by transmitter 106.

In some demonstrative embodiments, transmitter 106 may include a power detector scheme 134 configured to determine a calibrated transmission power of the at least one transmit chain 130, e.g., as described in detail below.

In some demonstrative embodiments, power detector scheme 134 may be configured to determine the calibrated transmission power of the at least one transmit chain 130, for example, without requiring calibration during production, e.g., while maintaining a relatively accurate reading of the transmission power. For example, power detector scheme 134 may be configured to determine the calibrated transmission power with an error of no more than +/−0.5 decibel (dB), e.g., even under variations in manufacturing process, supply voltage, temperature (collectively referred to as "Process-Voltage-Temperature (PVT)"), and the like.

In some demonstrative embodiments, power detector scheme 134 may be configured to provide the calibrated transmission power with a reduced sensitivity a Voltage-Standing-Wave-Ratio (VSWR). For example, power detector scheme 134 may be configured to determine the calibrated transmission power with an error of no more than +/−0.5 decibel (dB), e.g., even under variations of VSWR.

In some demonstrative embodiments, power detector scheme 134 may be configured to provide the calibrated transmission power with a total error of no more than +/−1 dB, e.g., without requiring any external calibration during production.

Accordingly, in some demonstrative embodiments, power detector scheme 134 may provide a reduction in a production cost of transmitter 106 and/or a reduction in a power consumption of transmitter 106, e.g., compared to conventional transmitters, which may require calibration during production and/or may implement design and/or safety margins, for example, in order to ensure compliance with error-vector-magnitude (EVM) requirements, spectral mask requirements, and/or any other suitable requirements, e.g., of a standard, specification and/or protocol.

In some demonstrative embodiments, power detector scheme 134 may include at least one power detection circuit 138, which may be coupled to the at least one transmit chain 130 by at least one first coupler 136, e.g., a directional coupler. Power detection circuit 138 may be configured to provide an output 140 representing a non-calibrated transmission power over transmit chain 130, e.g., as described in detail below.

In some demonstrative embodiments, coupler 136 may include an integrated directional coupler. Coupler 136 may include on a "sampler" directional coupler, which may be much shorter than a conventional λ/4 coupler, and may use capacitive coupling to generate a required directivity. Such a directional coupler may have a relatively small size and/or relatively low loss.

In some demonstrative embodiments, coupler 136 may be compensated, e.g., for stability over process and/or frequency, for example, based on a calibrated coupling factor of a reference coupler, e.g., similar to coupler 136, as described below.

In some demonstrative embodiments, power detector scheme 134 may include a reference circuit 146 to provide an output 144 representing a reference coupling-factor. For example, reference circuit 146 may be coupled to a reference voltage 150 by a second coupler 148, e.g., a directional coupler. According to this example, reference circuit 146 may provide output 144 representing the reference coupling-factor corresponding to coupler 148.

In some demonstrative embodiments, coupler 136 and coupler 148 may have similar characteristics. For example, directional coupler 148 may be substantially identical to directional coupler 136.

According to these demonstrative embodiments, reference circuit 146 may be utilized to determine the reference coupling-factor corresponding to a coupling factor of coupler 136.

In some demonstrative embodiments, coupler 136 may be coupled to transmit chain 130 between power amplifier 132 and antenna 110.

In some demonstrative embodiments, power detector scheme 134 may also include a calibrator 142 to determine the calibrated transmission power over the at least one transmit chain 130 based on the non-calibrated transmission power of output 140 corresponding to the transmit chain 130 and the reference coupling factor of output 144, e.g., as described below.

In some demonstrative embodiments, transmitter 106 may include a plurality of transmit chains 130, e.g., connected to a plurality of antennas 110.

According to these embodiments, power detector scheme 134 may include a plurality of power detection circuits 138 coupled to the plurality of transmit chains 130, e.g., by a plurality of directional couplers 136. In one example, each power detection circuit 138 may be coupled by a respective coupler 136 to a respective transmit chain 130.

According to these embodiments, reference circuit 146 may be used for commonly determining the reference coupling-factor corresponding to all couplers 136, for example, if all directional couplers 136 have substantially similar or identical characteristics.

According to these embodiments, calibrator 142 may receive an input corresponding to the plurality of non-calibrated transmission power outputs 140 from the plurality of power detection circuits 138, and may determine the calibrated transmission power of the plurality of transmit chains 130, based on the plurality of non-calibrated transmission power outputs 140 and the reference coupling-factor of output 144.

In some demonstrative embodiments, coupler 136 and/or coupler 148 may include a dual directional coupler. The dual directional coupler may provide, for example, improved performance of power detector scheme, e.g., as described below with reference to FIG. 9.

In some demonstrative embodiments, power detection circuit 138 may include a first power detector to measure a first power voltage corresponding to a coupled port of directional coupler 136 and a second power detector to measure a second power voltage corresponding to an isolated port of directional coupler 136. The non-calibrated transmission power of transmit chain 130 may be determined based on the first and second power voltages, e.g., as described below with reference to FIG. 2.

In some demonstrative embodiments, the non-calibrated transmission power of transmit chain 130 may be determined by an analog subtraction of the second power voltage from the first power voltage, e.g., as described below with reference to FIG. 2.

In some demonstrative embodiments, reference circuit 146 may include a first power detector to measure a first reference voltage corresponding to a transmitted port of directional coupler 148, and a second power detector to measure a second reference voltage corresponding to a coupled port of directional coupler 148. The reference coupling-factor of coupler 146 may be based on a ratio between the first and second reference voltages, e.g., as described below with reference to FIG. 3.

In some demonstrative embodiments, at least one power detector of power detection circuit 138 and/or reference circuit 146 may include a self-compensated power detector. For example, the self-compensated power detector may include a power detector, which is controlled by a digitally controlled resistor, a temperature-controlled current source, and/or a controlled bias current, e.g., as described below with reference to FIG. 4.

In some demonstrative embodiments, power detection circuit 138 and/or reference circuit 146 may include one or more impedance circuits to maintain a constant radio-frequency impedance at one or more of the power detectors of power detection circuit 138 and/or reference circuit 146, e.g., as described below with reference to FIGS. 2 and/or 3.

In some demonstrative embodiments, one or more elements of power detector scheme 134 may be integrated as part of an integrated chip, e.g., an RF integrated chip (RFIC). For example, PA 132, transmit chain 130, directional coupler 136, power detector circuit 138, directional, coupler 148, and/or reference circuit 146 may be implemented as part of a common RFIC. In other embodiments, one or more elements of power detector scheme 134 may be implemented using any other suitable shared and/or separate, integrated or non-integrated, elements and/or units.

Reference is made to FIG. 2, which schematically illustrates a power detection circuit 200, in accordance with some demonstrative embodiments. In some demonstrative embodiments, power detection circuit 200 may perform the functionality of power detection circuit 138 (FIG. 1).

In some demonstrative embodiments, power detection circuit 200 may be coupled to a transmit chain 202 via a dual directional coupler 204. For example, transmit chain 202 may perform the functionality of transmit chain 130 (FIG. 1) and/or directional coupler 204 may perform the functionality of directional coupler 136 (FIG. 1).

In some demonstrative embodiments, power detection circuit 200 may include a first power detector 210 to measure a first power voltage, denoted $V_{coup1}$, corresponding to a coupled port 206 of directional coupler 204.

In some demonstrative embodiments, power detection circuit 200 may include a second power detector 212 to measure a second power voltage, denoted $V_{coup2}$, corresponding to an isolated port 208 of directional coupler 204.

In some demonstrative embodiments, a non-calibrated transmission power of transmit chain 202 may be determined based on the power voltages $V_{coup1}$ and $V_{coup2}$.

In some demonstrative embodiments, the non-calibrated transmission power of transmit chain 202 may be determined using a forward detection, e.g., the voltage $V_{coup2}$ at port 208, and a reverse detection, e.g., the voltage $V_{coup2}$ at port 208. The use of the forward and reverse detection may improve accuracy of the non-calibrated power measured by power detection circuit 200.

In some demonstrative embodiments, the non-calibrated transmission power of transmit chain 202 may be determined using an analog subtraction of the voltages $V_{coup2}-V_{coup1}$. The analog subtraction may reduce noise of a common bias and may provide a relatively fast reading.

For example, power detection circuit 200 may include a subtractor 222 to subtract the voltage $V_{coup2}$ from the voltage $V_{coup1}$.

In some demonstrative embodiments, power detection circuit 200 may include one or more impedance circuits to maintain a constant RF impedance at one or more of power detectors 210 and 212. For example, power detection circuit 200 may include an impedance circuit 214 to maintain a constant radio-frequency impedance at power detector 210 and/or an impedance circuit 216 to maintain a constant radio-frequency impedance at power detector 212.

In some demonstrative embodiments, maintaining a constant RF impedance at a point at which the voltage is measured by power detectors 210 and/or 212 may enable maintaining a stable power measurement. The level of the RF impedance may be defined, for example, according to an RF impedance level providing an improved, e.g., a best, directivity to coupler 204. For example, impedance circuits 214 and/or 216 may be configured to maintain a constant radio-frequency impedance of about 50 ohm, e.g., as described below with reference to FIG. 6.

In some demonstrative embodiments, power detectors 210 and/or 212 may include a self-compensated power detector, which may include, for example, a power detector, which is controlled by a digitally controlled resistor, a temperature-controlled current source, and/or a controlled bias current, e.g., as described below with reference to FIG. 4.

Reference is made to FIG. 3, which schematically illustrates a reference circuit 300, in accordance with some demonstrative embodiments. In some demonstrative embodiments, reference circuit 300 may perform the functionality of reference circuit 146 (FIG. 1).

In some demonstrative embodiments, reference circuit 300 may be coupled to a reference voltage 302 via a dual directional coupler 304. For example, reference voltage 302 may perform the functionality of reference voltage 150 (FIG. 1) and/or directional coupler 304 may perform the functionality of directional coupler 148 (FIG. 1).

In some demonstrative embodiments, reference circuit 300 may be configured to provide a reference coupling-factor corresponding to coupler 304.

In some demonstrative embodiments, reference circuit 300 may be configured to calibrate coupler 204 (FIG. 2). For example, coupler 304 may have characteristics similar to the characteristics of coupler 204 (FIG. 2), e.g., coupler 304 may be substantially identical to coupler 204 (FIG. 2). Accordingly, reference circuit 300 may provide an output, e.g., output 144 (FIG. 1), representing a reference coupling-factor corresponding to coupler 204 (FIG. 2), e.g., as described below.

In some demonstrative embodiments, reference circuit 300 may include a first power detector 312 to measure a first reference voltage, denoted $V_{main\_ref}$, corresponding to a transmitted port 306 of directional coupler 304. For example, power detector 312 may be connected to transmitted port 306 via a power divider having a predefined division ratio, denoted Div_ratio, e.g., to adjust a dynamic range of $V_{main\_ref}$.

In some demonstrative embodiments, reference circuit 300 may include a second power detector 314 to measure a second reference voltage, denoted $V_{coup\_ref}$, corresponding to a coupled port 308 of directional coupler 304.

In some demonstrative embodiments, reference circuit 300 may include one or more impedance circuits to maintain a constant radio-frequency impedance at one or more of power detectors 312 and 314. For example, reference circuit 300 may include an impedance circuit 318 to maintain a constant radio-frequency impedance at power detector 312 and/or an impedance circuit 316 to maintain a constant radio-frequency impedance at power detector 314.

In some demonstrative embodiments, reference circuit 300 may also include an impedance circuit 320 to maintain a constant radio-frequency impedance at an isolated port 310 of coupler 304.

In some demonstrative embodiments, an additional power detector 329 may be implemented to detect a power level at isolated port 310, e.g., to improve a calibration of the constant RF impedance.

In some demonstrative embodiments, maintaining a constant RF impedance at a point at which the voltage is measured by power detectors 312 and/or 314 may enable maintaining a stable power measurement. The level of the RF impedance may be defined, for example, according to an RF impedance level providing an improved, e.g., a best, directivity to coupler 304. For example, impedance circuits 316, 318 and/or 320 may be configured to maintain a constant radio-frequency impedance of about 50 ohm, e.g., as described below with reference to FIG. 6.

In some demonstrative embodiments, power detectors 312, 314 and/or 329 may include a self-compensated power detector, which may include, for example, a power detector, which is controlled by a digitally controlled resistor, a temperature-controlled current source, and/or a controlled bias current, e.g., as described below with reference to FIG. 4.

In some demonstrative embodiments, a reference coupling-factor, denoted Coup_ref, of coupler 304 may be based on a ratio between the voltages $V_{main\_ref}$ and $V_{coup\_ref}$. For example, reference coupling-factor Coup_ref may be determined as follows:

$$\text{Coup\_ref} = 20\log_{10}\left(\frac{V_{main\_ref}}{V_{coup\_ref}} \cdot \text{Div\_ratio}^2\right) \qquad (1)$$

In some demonstrative embodiments, the reference coupling-factor Coup_ref may represent a ratio between the voltage $V_{coup\_ref}$ coupled by coupler 304 and the actual voltage $V_{main\_ref}$ measured by power detector 312.

Referring back to FIG. 1, in some demonstrative embodiments, calibrator 142 may determine the calibrated transmission power over the at least one transmit chain 130 based on the power voltages $V_{coup1}$ and $V_{coup2}$ corresponding to the transmit chain 130, which may be received via output 140 from power detection circuit 138, and the reference coupling factor Coup_ref, which may be received via output 144, e.g., as described below.

In some demonstrative embodiments, calibrator 142 may determine a calibrated transmission power, denoted Pout_calc, over the at least one transmit chain 130, e.g., as follows:

$$\text{Pout\_calc} = 10 \cdot \log_{10}\left(\frac{V_{coup1} - V_{coup2}}{D_{gain} \cdot R_{coup}}\right) + \text{Coup\_ref} \qquad (2)$$

wherein $D_{gain}$ denotes a predefined detector sensitivity parameter of power detectors 210 and 212 (FIG. 2), and $R_{coup}$ denotes a predefined calibrated detector resistance of circuits 214 and 216 (FIG. 2).

Reference is now made to FIG. 4, which schematically illustrates a power detector 400, in accordance with some demonstrative embodiments. In some demonstrative embodiments, power detector 400 may perform the functionality of power detector 210 (FIG. 2), power detector 212 (FIG. 2), power detector 312 (FIG. 3), power detector 329 (FIG. 3) and/or power detector 314 (FIG. 3).

In some demonstrative embodiments, power detector 400 may be configured to detect a voltage 404 of an input signal 402, for example, independently of one or more factors. For example, power detector 400 may be configured to provide substantially the same detected voltage 404, e.g., with an error of no more than 0.5 dB, with respect the input signal 402, e.g., even under variations in PVT, and the like.

In some demonstrative embodiments, stability of power detector 400 with respect to variations in PVT may be achieved, for example, by stabilizing each circuit element of power detector 400, e.g., independently.

In some demonstrative embodiments, power detector 400 may include a self-compensated power detector. For example, power detector 400 may be controlled by a digitally controlled resistor 406, a temperature-controlled current source 408, and/or a controlled bias current 407, e.g., as described below In some demonstrative embodiments, the bias current may be controlled to be constant over process, e.g., using a constant Vds loop including an Operational Amplifier (Op-Amp) 405 to maintain substantially the same current and a drain-to-source voltage (Vds) voltage on a pair of transistors 411 and 413 of detector 400.

In some demonstrative embodiments, temperature-controlled current source 408 may include a Proportional to Absolute Temperature (PTAT) current source having a defined current slope over temperature matching the detector response. For example, the PTAT current may be configured to provide a PTAT current 409 designed to fit a temperature behavior of power detector 400. In one example, which may be suitable, for example, for use by an DMG STA, the PTAT current may linearly follow the temperatures between 0-100 deg by a current change of 12-17 micro Ampere (µA), for example, such that current 409 is 17 µA at a temperature of 100 deg, 15 µA at a temperature of 60 deg and 12 µA at a temperature of 0 deg, e.g., according to linear function.

In some demonstrative embodiments, resistor 406 may be calibrated using a digital calibration process, e.g., a Finite State Machine (FSM) to maintain a substantially constant resistance value. In one example, a common FSM may be utilized to control and/or calibrate resistors of a plurality of power detectors, e.g., power detector 210 (FIG. 2), power detector 212 (FIG. 2), power detector 312 (FIG. 3), power detector 329 (FIG. 3) and/or power detector 314 (FIG. 3).

Figure 5:
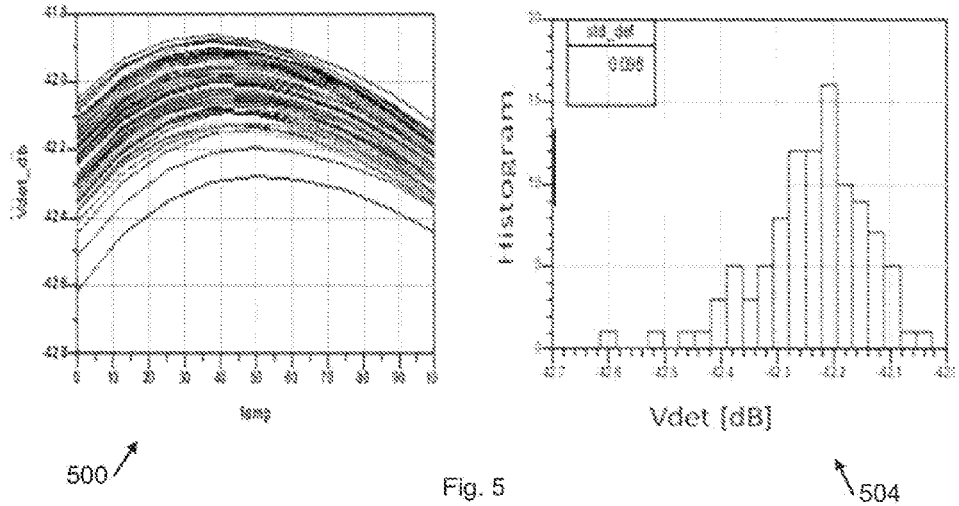
FIG. 5 is an illustration of two performance graphs corresponding to a self-compensated power detector, in accordance with some demonstrative embodiments.

FIG. 5 illustrates a temperature-based performance graph 500, and a process-based performance graph 504 corresponding to a self-compensated power detector, e.g., power detector 400 (FIG. 4), in accordance with some demonstrative embodiments.

As shown in FIG. 5, the power detector may be very stable over PVT variations. For example, as shown by graph 500, an output power of the power detector may vary by about 0.2 dB across a temperature range of 0-100 deg. As shown by graph 504, the output power of the power detector may vary by about 0.6 dB across process variation. Accordingly, a total variation of the power detector may be about 0.8 dB, which may be represent a variation of ±0.4 dB in the output power of the power detector, which in turn may represent a detection error ±0.2 dB.

Figure 6:
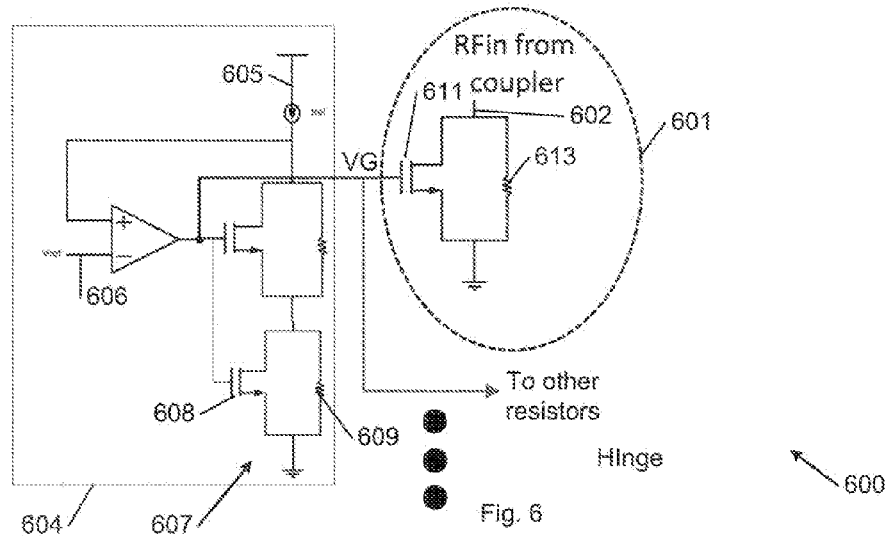
FIG. 6 is a schematic illustration of an impedance calibration circuit, in accordance with some demonstrative embodiments.

Reference is made to FIG. 6, which schematically illustrates an impedance circuit 600, in accordance with some demonstrative embodiments. In some demonstrative embodiments, impedance circuit 600 may perform the functionality of impedance circuit 214 (FIG. 2), impedance circuit 216 (FIG. 2), impedance circuit 316 (FIG. 3), impedance circuit 318 (FIG. 3) and/or impedance circuit 320 (FIG. 3).

In some demonstrative embodiments, impedance circuit 600 may be configured to maintain a substantially constant RF impedance at an RF point 602, to which impedance circuit 600 may be connected. For example, RF point 602 may include a power detection point, at which a power detector, e.g., power detectors 210 (FIG. 2), 212 (FIG. 2), 312 (FIG. 3) and/or 314 (FIG. 3), is to detect a voltage.

In some demonstrative embodiments, impedance circuit 600 may be configured to maintain a predefined RF impedance level at RF point 602 to enable, for example, power detectors 210 (FIG. 2), 212 (FIG. 2), 312 (FIG. 3) and/or 314 (FIG. 3) to maintain a stable voltage reading.

In some demonstrative embodiments, the RF impedance level may be predefined, for example, to provide an improved, e.g., a best, directivity to a coupler, which is used to couple a signal to the power detector. For example, impedance circuit 600 may be configured to maintain a constant radio-frequency impedance of about 50 ohm.

In some demonstrative embodiments, impedance circuit 600 may include controllable resistance circuit 601 coupled to point 602. Circuit 601 may include a field-effect transistor (FET) 611 coupled in parallel to a resistor 613.

In some demonstrative embodiments, impedance circuit 600 may include a reference resistance circuit 604 to control FET 611 using a control voltage, denoted Vg. Reference resistance circuit 604 may receive a reference current 605, denoted Iref, and a reference voltage 606, denoted Vref. The current 605 and the voltage 606 may be configured to provide a required reference resistance, denoted R, e.g., R=Vref/Iref. Reference resistance circuit 604 may include one or more circuits 607, e.g., two or more cascaded circuits 607. Circuits 607 may include a FET 608 coupled in parallel to a resistor 609. Circuits 607 may be configured to maintain a Vds close to 0 Volt.

In some demonstrative embodiments, a common reference resistance circuit 604 may be utilized to provide voltage Vg of a plurality of resistance circuits 601.

Referring back to FIG. 1, in some demonstrative embodiments, calibrator 142 may determine the calibrated transmission power over transmit chain 130 with respect to a transmission signal having a peak-to-average-power-ratio (PAPR) lesser than a predefined PAPR threshold. For example, calibrator 142 may determine the calibrated transmission power over transmit chain 130 in synchronization with transmission of a preamble of a wireless communication packet via transmit chain 130, e.g., as described below.

In some demonstrative embodiments, calibrator 142 may be configured to synchronize to a timing of the transmission via transmit chain 130, for example, based on timing information 169 corresponding to a timing of the transmission via transmit chain 130. For example, timing information 169 may be provided to calibrator 142 in the form of one or more integration triggers from a controller 168. Controller 168 may include, for example, a wireless communication driver, a modulator-demodulator (modem), a media-access-controller (MAC), and the like.

In some demonstrative embodiments, the PAPR threshold may be defined to ensure relatively fast and accurate reading during a real transmission via transmit chain 130.

Figure 7:
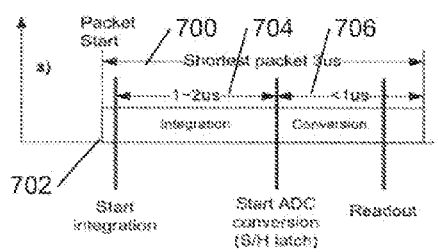
FIG. 7 is a schematic illustration of a timing diagram for power detection of a wireless communication signal, in accordance with some demonstrative embodiments.

FIG. 7 schematically illustrates a timing diagram for power detection of a wireless communication signal, in accordance with some demonstrative embodiments. As shown in FIG. 7, calibrator 142 (FIG. 1) may synchronize to a transmission of a packet, which may have a duration 700 of at least 3 micro seconds (μs), e.g., including a short preamble having a duration of about 1.23 μs, a channel estimation duration of about 0.65 μs, a header duration of about 0.65 μs and/or a timing tolerance of about −0.3 μs. Calibrator 142 (FIG. 1) may sample the non-calibrated power of output 140 (FIG. 1) during an integration period 704, e.g., a period of between about 1 μs and 2 μs, which may be synchronized to cover a preamble of the packet. Calibrator 142 (FIG. 1) may then process the sampled non-calibrated power during a subsequent period 706, e.g., shorter than 1 μs.

Figure 8:
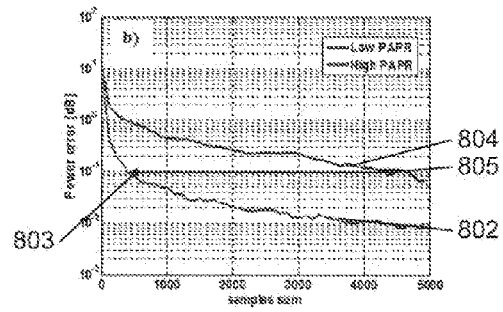
FIG. 8 is an illustration of a graph including first and second curves depicting a power error versus a number of samples corresponding to first and second respective Peak-to-Average-Power-Ratio (PAPR) levels, in accordance with some demonstrative embodiments.

FIG. 8 is an illustration of a graph including a first curve 802 depicting a power error versus a number of samples corresponding to a first Peak-to-Average-Power-Ratio (PAPR) level, and a second curve 804 depicting the power error versus the number of samples corresponding to a second PAPR level, which is greater than the first PAPR level, in accordance with some demonstrative embodiments.

As shown in FIG. 8, a first power error corresponding to a particular number of samples at the first PAPR level may be lesser than a second power error corresponding to the same particular number of samples at the second PAPR level.

Accordingly, sampling the non-calibrated power of output 140 (FIG. 1) at the first, lower, PAPR level may require a number of samples 803, e.g., about 500 samples, which may be lesser than a number of samples 805, e.g., about 4800 samples, required for achieving a comparable power error, e.g., about $10^{-1}$ dB, at the second, higher, PAPR level. Therefore, sampling the non-calibrated power of output 140 (FIG. 1) of a transmission signal having a reduced PAPR level may enable achieving a reduced power error while utilizing a reduced sampling period.

Figure 9:
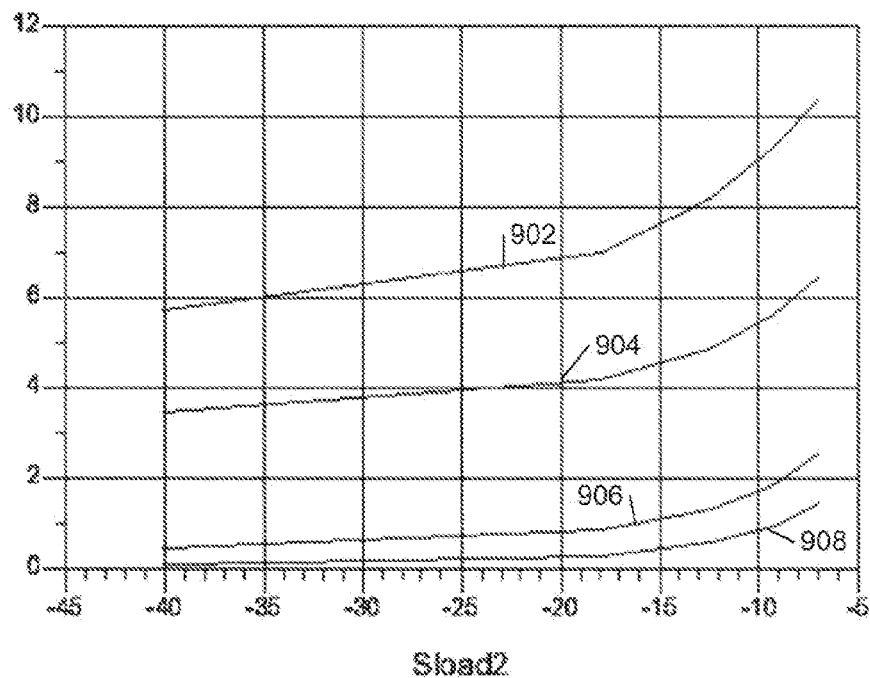
FIG. 9 schematically illustrates a graph depicting four curves representing a detected power error versus Voltage-Standing-Wave-Ratio (VSWR) of four respective power detector schemes, in accordance with some demonstrative embodiments.

FIG. 9 schematically illustrates a graph depicting a first curve 902, a second curve 904, a third curve 906 and a fourth curve 908 representing a detected power error versus VSWR of four respective power detector schemes, in accordance with some demonstrative embodiments.

In some demonstrative embodiments, curve 902 may correspond to a power detector scheme including a direct sampling of the output voltage of a PA; curve 904 may correspond to a power detector scheme including extracting the output voltage of the PA 132 to a 50 ohm load, e.g., according to an Open Loop Gain (OLG) scheme; curve 906 may correspond to a power detector scheme including a single directional coupler to couple the output voltage to a power detector; and curve 908 may correspond to a power detector scheme, e.g., power detector scheme 134 (FIG. 1) including a dual directional coupler, e.g., coupler 136 (FIG. 1) to couple the output voltage of PA 132 (FIG. 1) to a power detection circuit, e.g., power detection circuit 138 (FIG. 1).

As shown in FIG. 9, the power detector scheme represented by curve 908 may provide an improvement of about 8 dB compared to the power detector scheme represented by curve 902, and an improvement of about 1 dB compared to the power detector scheme represented by curve 906.

Figure 10:
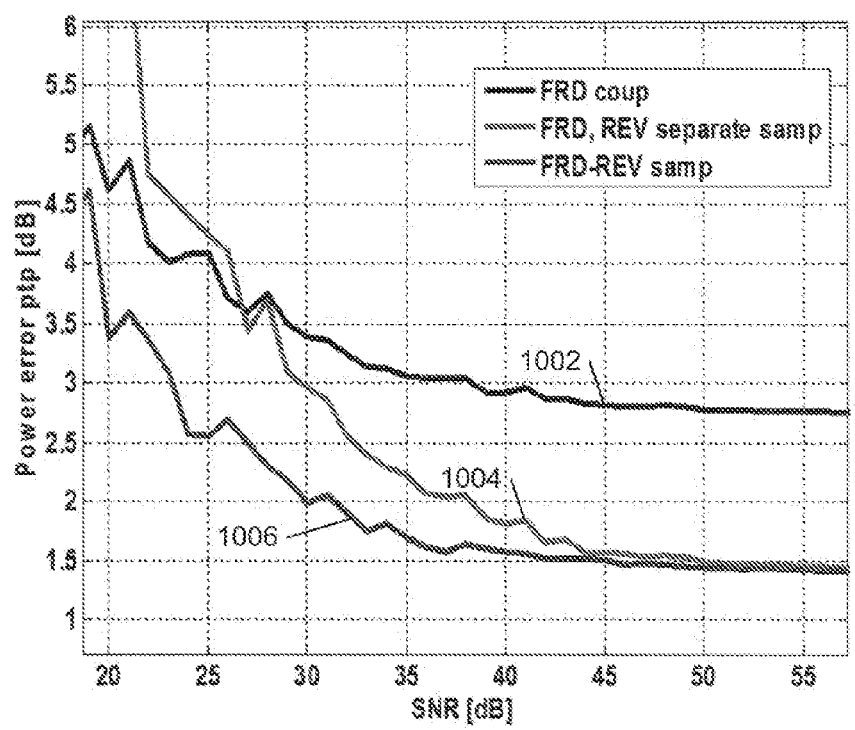
FIG. 10 is a schematic illustration of a graph including three curves depicting a power error versus signal-to-noise-ratio (SNR) of a power detected according to three respective sampling schemes, in accordance with some demonstrative embodiments.

FIG. 10 schematically illustrates a graph including a curve 1002 depicting a power error versus signal-to-noise-ratio (SNR) of a power detected based on sampling a forward coupling of a coupler, e.g., under degraded VSWR conditions, a curve 1004 depicting the power error versus SNR of a power detected based on separately sampling a forward coupling and a reverse coupling of a coupler, e.g., under degraded VSWR conditions, and a curve 1006 depicting the power error versus SNR of a power detected based on sampling the difference between the forward coupling and reverse coupling of a coupler, in accordance with some demonstrative embodiments. For example, curve 1006 may correspond to sampling the analog subtraction $V_{coup2}-V_{coup1}$ e.g., of power detection circuit 138 (FIG. 1). Curve 1004 may correspond, for example, to separately sampling the voltages $V_{coup2}$ and $V_{coup1}$, and then subtracting the sampled voltages.

As shown in FIG. 10, sampling the analog subtraction $V_{coup2}-V_{coup1}$, as represented by curve 1006, may provide a power error at a reduced SNR level, e.g., compared to separately sampling the voltages $V_{coup2}$ and $V_{coup1}$, as represented by curve 1004. For example, sampling the analog subtraction $V_{coup2}-V_{coup1}$, as represented by curve 1006, may provide a power error of about 1.6 dB at an SNR of 35 dB, while separately sampling the voltages $V_{coup2}$ and $V_{coup1}$, as represented by curve 1004, may provide substantially the same power error of about 1.6 dB at a higher SNR level of 43 dB. Accordingly, sampling the analog subtraction $V_{coup2}-V_{coup1}$, as represented by curve 1006, may provide an 8 db SNR improvement compared to separately sampling the voltages $V_{coup2}$ and $V_{coup1}$, as represented by curve 1004.

Figure 11:
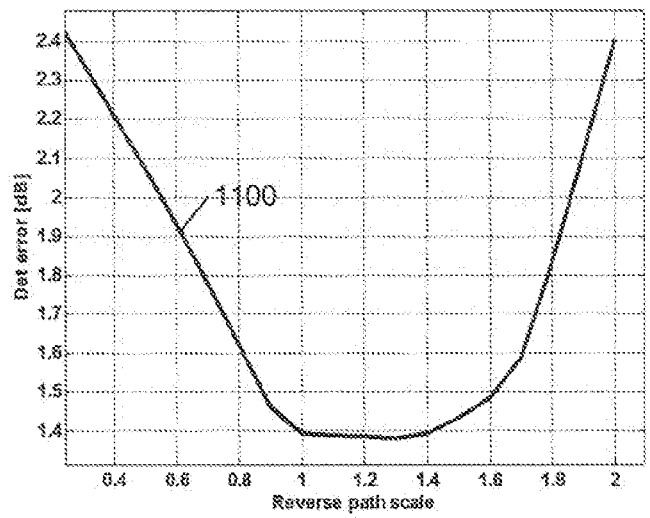
FIG. 11 is a schematic illustration of a graph including a curve depicting a power detection error versus a reverse weighting factor (Scale) applied to an analog subtraction of forward and reverse voltages, in accordance with some demonstrative embodiments.

FIG. 11 illustrates a graph including a curve 1100 depicting a power detection error, denoted Det error, versus a reverse weighting factor (Scale), denoted Fact, applied to the analog subtraction of the voltages, in accordance with some demonstrative embodiments. For example, the detection error may be calculated by $V_{coup1}-FACT*V_{coup2}$. As shown in FIG. 11, a weighting factor of between 0.95 and 1.5 may provide optimal performance.

Figure 12:
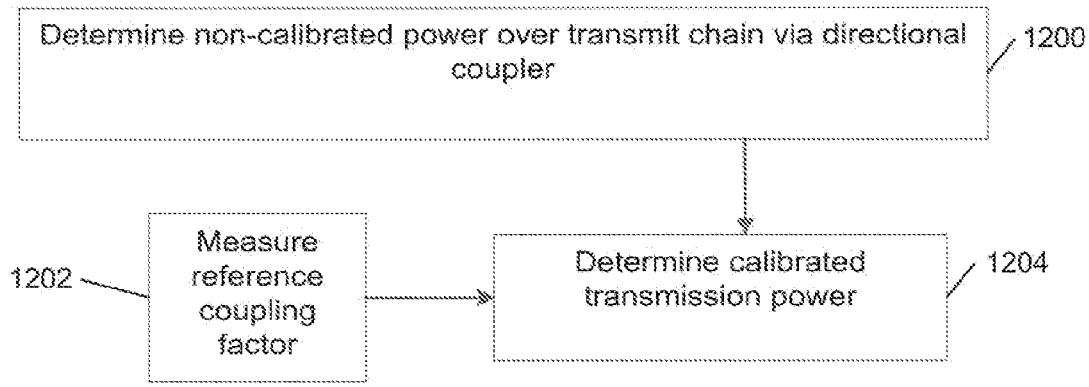
FIG. 12 is a schematic flow-chart illustration of a method of detecting transmitter power, in accordance with some demonstrative embodiments.

Reference is made to FIG. 12, which schematically illustrates a method of detecting transmitter power, in accordance with some demonstrative embodiments. In some embodiments, one or more of the operations of the method of FIG. 12 may be performed by a wireless communication system, e.g., system 100 (FIG. 1), a wireless communication device, e.g., device 102 (FIG. 1), a transmitter, e.g., transmitter 106 (FIG. 1), and/or a power detection scheme, e.g., power detection scheme 134 (FIG. 1).

As indicated at block 1200, the method may include determining a non-calibrated transmission power over a transmit chain, via a first directional coupler coupled to the transmit chain. For example, power detection circuit 138 (FIG. 1) may detect a non-calibrated transmission power over transmit chain 130 (FIG. 1), via directional coupler 136 (FIG. 1) coupled to transmit chain 130 (FIG. 1), e.g., as described above.

In some demonstrative embodiments, determining the non-calibrated transmission power over the transmit chain may include measuring a first power voltage corresponding to a coupled port of the first directional coupler, measuring a second power voltage corresponding to an isolated port of the first directional coupler, and determining the non-calibrated transmission power based on the first and second power voltages.

As indicated at block 1202, the method may include measuring a reference coupling-factor of a second directional coupler coupled to a reference voltage. For example, reference circuit 146 (FIG. 1) may measure the reference coupling-factor of directional coupler 148 (FIG. 1) coupled to reference voltage 150 (FIG. 1), e.g., as described above.

In some demonstrative embodiments, measuring the reference coupling-factor of the second directional coupler may include measuring a first reference voltage corresponding to a transmitted port of the second directional coupler, measuring a second reference voltage corresponding to a coupled port of the second directional coupler, and determining the reference coupling factor based on a ratio between the first and second reference voltages, e.g., as described above with reference to FIG. 3.

As indicated at block 1204, the method may include determining a calibrated transmission power over the transmit chain based on the non-calibrated transmission power and the reference coupling factor. For example, calibrator 142 (FIG. 1) may determine a calibrated transmission power over transmit chain 130 (FIG. 1) based on the non-calibrated transmission power of output 140 (FIG. 1) and the reference coupling factor of output 144 (FIG. 1), e.g., as described above.

Figure 13:
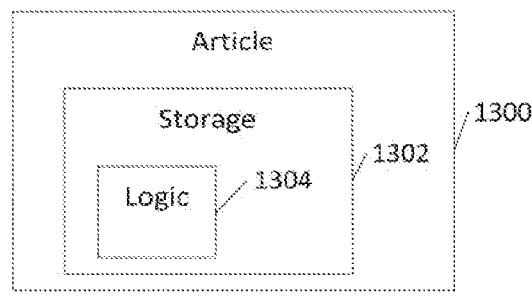
FIG. 13 is a schematic illustration of an article of manufacture, in accordance with some demonstrative embodiments.

Reference is made to FIG. 13, which schematically illustrates an article of manufacture 1300, in accordance with some demonstrative embodiments. Article 1300 may include a non-transitory machine-readable storage medium 1300 to store logic 1304, which may be used, for example, to perform at least part of the functionality of device 102 (FIG. 1), transmitter 106 (FIG. 1), power detector scheme 134 (FIG. 1), and/or calibrator 142 (FIG. 1) and/or to perform one or more operations of the method of FIG. 12. The phrase "non-transitory machine-readable medium" is directed to include all computer-readable media, with the sole exception being a transitory propagating signal.

In some demonstrative embodiments, article 1300 and/or machine-readable storage medium 1302 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A device comprising:
    a power detection circuit, coupled by a first coupler to a transmit chain, to provide a first output representing a non-calibrated transmission power over said transmit chain;
    a reference circuit, coupled to a reference voltage by a second, directional, coupler, the reference circuit comprising first power detector to measure a first voltage corresponding to a transmitted port of the second coupler, and a second power detector to measure a second voltage corresponding to a coupled port of the second coupler, said reference circuit to provide a second output representing a reference coupling factor based on a ratio between said first and second voltages; and
    a calibrator to determine a calibrated transmission power over said transmit chain based on the first and second outputs.

2. The device of claim 1, wherein at least one of said first and second power detectors is controlled by a digitally controlled resistor, a temperature-controlled current source, and a controlled bias current.

3. The device of claim 1, wherein said reference circuit comprises an impedance circuit to maintain a constant radio-frequency impedance at said first and second power detectors.

4. The device of claim 1, wherein said second coupler is identical to said first coupler.

5. The device of claim 1, wherein said first and second couplers comprise dual directional couplers.

6. A device comprising:
a power detection circuit, coupled by a first, directional, coupler to a transmit chain, said power detection circuit comprising a first power detector to measure a first power voltage corresponding to a coupled port of the first coupler, and a second power detector to measure a second power voltage corresponding to an isolated port of the first coupler, the power detection circuit to provide a first output representing a non-calibrated transmission power over said transmit chain based on said first and second power voltages;
a reference circuit, coupled to a reference voltage by a second coupler, to provide a second output representing a reference coupling factor; and
a calibrator to determine a calibrated transmission power over said transmit chain based on the first and second outputs.

7. The device of claim 6, wherein said non-calibrated transmission power is based on an analog subtraction of said second power voltage from said first power voltage.

8. The device of claim 6, wherein said power detection circuit comprises an impedance circuit to maintain a constant radio-frequency impedance at said first and second power detectors.

9. The device of claim 6, wherein said calibrator is to determine said calibrated transmission power with respect to a transmission signal having a peak-to-average-power-ratio (PAPR) lesser than a predefined PAPR threshold.

10. The device of claim 9, wherein said calibrator is to determine said calibrated transmission power in synchronization with transmission of a preamble of a wireless communication packet.

11. The device of claim 6, wherein at least one of said first and second power detectors is controlled by a digitally controlled resistor, a temperature-controlled current source, and a controlled bias current.

12. The device of claim 6, wherein said first coupler is coupled to said transmit chain between a power amplifier and an antenna of said transmit chain.

13. A system comprising:
a wireless communication device comprising:
a processor;
a memory;
a transmit chain including a power amplifier connected to an antenna;
a power detection circuit, coupled by a first coupler to said transmit chain, to provide a first output representing a non-calibrated transmission power over said transmit chain;
a reference circuit, coupled to a reference voltage by a second, directional, coupler, said reference circuit comprising a first power detector to measure a first voltage corresponding to a transmitted port of the second coupler, and a second power detector to measure a second voltage corresponding to a coupled port of the second coupler, said reference circuit to provide a second output representing a reference coupling factor based on a ratio between said first and second voltages; and
a calibrator to determine a calibrated transmission power over said transmit chain based on the first and second outputs.

14. The system of claim 13, wherein at least one of said first and second power detectors is controlled by a digitally controlled resistor, a temperature-controlled current source, and a controlled bias current.

15. The system of claim 13, wherein said reference circuit comprises an impedance circuit to maintain a constant radio-frequency impedance at said first and second power detectors.

16. The system of claim 13, wherein said calibrator is to determine said calibrated transmission power with respect to a transmission signal having a peak-to-average-power-ratio (PAPR) lesser than a predefined PAPR threshold.

17. A system comprising:
a wireless communication device comprising:
a processor;
a memory;
a transmit chain including a power amplifier connected to an antenna;
a power detection circuit, coupled by a first, directional, coupler to said transmit chain, said power detection circuit comprising a first power detector to measure a first power voltage corresponding to a coupled port of the first coupler, and a second power detector to measure a second power voltage corresponding to an isolated port of the first coupler, said power detection circuit to provide a first output representing a non-calibrated transmission power over said transmit chain based on said first and second power voltages;
a reference circuit, coupled to a reference voltage by a second coupler, to provide a second output representing a reference coupling factor; and
a calibrator to determine a calibrated transmission power over said transmit chain based on the first and second outputs.

18. The system of claim 17, wherein said non-calibrated transmission power is based on an analog subtraction of said second power voltage from said first power voltage.

19. The system of claim 17, wherein said second coupler is identical to said first coupler.

20. The system of claim 17, wherein at least one of said first and second power detectors is controlled by a digitally controlled resistor, a temperature-controlled current source, and a controlled bias current.

21. The system of claim 17, wherein said first and second couplers comprise dual directional couplers.

22. A method comprising:
determining a non-calibrated transmission power over a transmit chain, via a first coupler coupled to said transmit chain;
determining a reference coupling factor of a second coupler coupled to a reference voltage based on a first voltage corresponding to a transmitted port of the second coupler and a second voltage corresponding to a coupled port of the second coupler; and
determining a calibrated transmission power over said transmit chain based on the non-calibrated transmission power and the reference coupling factor.

23. The method of claim 22 comprising determining said calibrated transmission power in synchronization with transmission of a preamble of a wireless communication packet.

24. A method comprising:
determining a non-calibrated transmission power over a transmit chain, via a first coupler coupled to said transmit chain, based on a first power voltage corresponding to a coupled port of the first coupler and a second power voltage corresponding to an isolated port of the first coupler;

determining a reference coupling factor of a second coupler coupled to a reference voltage; and determining a calibrated transmission power over said transmit chain based on the non-calibrated transmission power and the reference coupling factor.

25. The method of claim 24 comprising determining said calibrated transmission power in synchronization with transmission of a preamble of a wireless communication packet.

26. A product including a non-transitory storage medium having stored thereon instructions that, when executed by a machine, result in:

determining a calibrated transmission power over a transmit chain based on a non-calibrated transmission power, which is detected over the transmit chain via a first coupler coupled to said transmit chain, and a reference coupling factor of a second coupler coupled to a reference voltage, wherein said instructions result in determining said reference coupling factor based on a first voltage corresponding to a transmitted port of the second coupler and a second voltage corresponding to a coupled port of the second coupler.

27. The product of claim 26, wherein said instructions result in determining said calibrated transmission power in synchronization with transmission of a preamble of a wireless communication packet.

28. A product including a non-transitory storage medium having stored thereon instructions that, when executed by a machine, result in:

determining a non-calibrated transmission power over a transmit chain based on a first power voltage corresponding to a coupled port of a first coupler, which is coupled to said transmit chain, and a second power voltage corresponding to an isolated port of the first coupler; and determining a calibrated transmission power over said transmit chain based on the non-calibrated transmission power and a reference coupling factor of a second coupler coupled to a reference voltage.

29. The product of claim 28, wherein said instructions result in determining said calibrated transmission power in synchronization with transmission of a preamble of a wireless communication packet.

* * * * *

UNITED STATES PATENT AND TRADEMARK OFFICE
CERTIFICATE OF CORRECTION

| | | |
|---|---|---|
| PATENT NO. | : 8,731,494 B2 | Page 1 of 1 |
| APPLICATION NO. | : 13/535430 | |
| DATED | : May 20, 2014 | |
| INVENTOR(S) | : Emanuel Cohen et al. | |

It is certified that error appears in the above-identified patent and that said Letters Patent is hereby corrected as shown below:

In the Claims

Column 16, line 54, in claim 1, before "first power" insert -- a --.

Signed and Sealed this
Fourteenth Day of October, 2014

Michelle K. Lee
*Deputy Director of the United States Patent and Trademark Office*